Feb. 19, 1952     W. M. EMERY     2,586,314
ROLLER DEVICE IMPACT CLUTCH

Filed Feb. 7, 1945     2 SHEETS—SHEET 1

INVENTOR.
William M. Emery
BY
Stoodling and Krost
attys

Feb. 19, 1952 W. M. EMERY 2,586,314
ROLLER DEVICE IMPACT CLUTCH
Filed Feb. 7, 1945 2 SHEETS—SHEET 2

INVENTOR.
William M. Emery
BY
Stoodling and Krost
attys.

Patented Feb. 19, 1952

2,586,314

UNITED STATES PATENT OFFICE 2,586,314

ROLLER DEVICE IMPACT CLUTCH

William M. Emery, Summit, N. J., assignor to The Rotor Tool Company, a corporation of Ohio Application February 7, 1945, Serial No. 576,643

2 Claims. (Cl. 192—30.5)

1

My invention relates to improvements in impact clutches generally, and more specifically to an impact clutch mechanism which is particularly adapted for use with portable power driven tools, such as employed for rotating or tightening screws or nuts.

An object of my invention is the provision of an impact clutch which is operable by centrifugal force to interlock the clutch parts, and is automatically released when the turning torque of the work piece becomes excessive, and thereafter delivers a series of torque producing impact blows without stalling or materially decreasing the speed of the driver.

Another object of my invention is to provide an improved clutch means for an impact clutch employing interlocking parts which are automatically released when the turning torque of the work piece becomes excessive, and to provide an air pressure cushion to oppose the releasing action.

Another object of my invention is to provide an improved clutch means for an impact clutch employing interlocking parts which are automatically released when the turning torque of the work piece becomes excessive, and to provide cam surfaces to oppose the releasing of the interlocking parts.

Another object of my invention is to provide an impact clutch having an outer driven member and an inner driving member with means responsive to centrifugal force to interlock said driven and driving member, and having impact surfaces on the driven member to contact the centrifugal responsive means and force same out of the interlocking position.

Other objects and a fuller understanding of my invention may be had by referring to the following description and claims, taken in conjunction with the accompanying drawing, in which:

2

Figure 6:
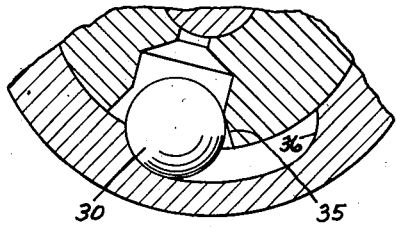

Figure 6 is a fragmentary view of the interconnecting balls in contact with both the driver and driven members.

Figure 1:
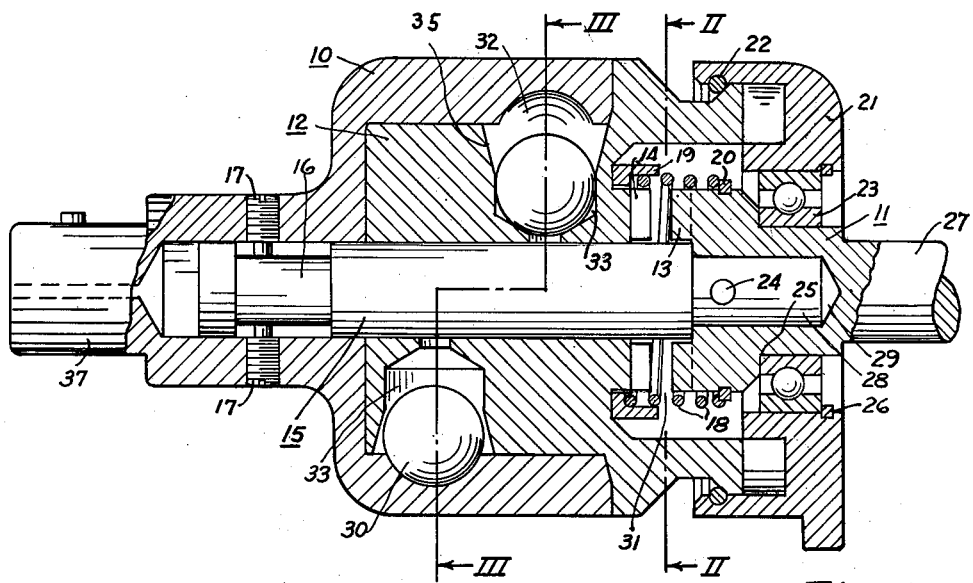
Figure 1 is a longitudinal cross-sectional view of an impact clutch employing the principles of my invention.

With reference to the Figure 1, I illustrate a cross-sectional view of a type of impact clutch employing the principles of my invention. In this embodiment I illustrate a torque transmitting member 11 having a power shaft 27 to receive rotational power from a suitable driving source. The power shaft 27 is illustrated broken off, and may extend to any suitable driving power unit, not part of this invention. Suitable driving power units may include electric, fluid or pneumatic motors or any mechanical means.

A hammer member 12, and an anvil member 10 are held in axial alignment with the torque transmitting member 11 by means of a longitudinal slidably mounted spindle 15. An extension 28 on the spindle 15 is secured within a centrally disposed hole 29 in the torque transmitting member 11. A bearing plate 21 is slidably mounted upon the hammer member 12 and is disposed to carry a bearing 23 to provide bearing surfaces for the torque transmitting member 11. The bearing 23, which is illustrated as being a ball bearing, is secured to the torque transmitting member 11 and the slidable bearing plate 21. Abutment corners 25 on the torque transmitting member 11, and a retainer ring 26 on the bearing plate 21, serve to secure the bearings 23 to the bearing plate 21 and the transmitting member 11 in such a manner that the members 21 and 11 may rotate relative to one another, but are held against longitudinal movement therebetween, and therefore, must move endwise as a unit. A snap ring 22 is provided to limit the movement of the bearing plate 21 away from the hammer member 12.

There are two clutch members in this embodiment of my invention. The first clutch member is indicated generally by the reference character 31 and is of the conventional dog clutch type and operates between the torque transmitting member 11 and the hammer member 12. The dog clutch 31 comprises teeth 13 on the torque transmitting member 11, and teeth 14 on the hammer member 12, which are normally held apart by a spring 18 positioned between the members 11 and 12 by a guide and stop member 19 mounted on the hammer member 12, and a stop 20 mounted on the torque transmitting member 11. The second clutch member is indicated generally by the reference character 32 and is the impact clutch illustrated in cross-section in the Figures 3 or 5. The clutches 31 and 32 are both illustrated in their relaxed position, and therefore, the ball 30 on the lower side of the illustration is shown in its outward position because of gravity. The impact clutch 32 is illustrated as comprising apertures 33 in the hammer member 12, impact races 34 on the anvil member 10, and interconnecting clutch balls 30 positioned to interconnect the hammer member 12 and the anvil member 10. The impact races 34 are preferably offset a longitudinal distance in an axial direction from each other, as illustrated in the Figures 1 and 4, in order that each of the balls 30 will operate in only one impact race 34. The apertures 33, in this embodiment of my invention, are provided with a flared portion 35, and the impact races 34 are disposed to provide impact abutment surfaces 36 against which the balls 30 may strike. Although the impact races 34 are offset, they are spaced apart in substantially 180° relationship to each other in order that the balls 30 may strike their respective abutment surfaces 36 at the same time and thereby act as a unit. The Figure 5 illustrates an alternative type of race 34 in which there only is one impact surface provided. The impact surfaces 36 and the flared portion 35 may be varied to suit the individual requirements of the particular size of impact clutch.

The torque transmitting member 11, and the spindle 15 are held together by a pin 24 interconnecting the two members and they move as a unit. It will be noted, that a reduced section 16 is provided near one end of the spindle 15 with stop plugs 17 positioned to extend from the anvil 10 into the reduced section 16, whereby the endwise movement of the spindle 15 and consequently the endwise movement of the torque transmitting member 11, is limited. The hammer member 12 is bearinged on the spindle 15, but is full floating thereon and is thus free to move in any direction relative to the spindle 15 except as restrained by other influences.

A work engagement part 37 is provided on the anvil member 10 to hold a suitable tool thereon. Although the part 37 is illustrated as a square stud to receive a socket of a tool, it is understood that any suitable work engagement part may be provided in place thereof. In other words, conventional means may be used for attaching thereto suitable drivers for studs, screws and the like which are not part of this invention.

For the purpose of illustrating, assume that the device is to be used to tighten a nut on a stud. As the operator places pressure upon the shaft 27, the torque transmitting member 11 is moved into engagement with the hammer member 12 against the urging of the spring 18 and interlocks the teeth 13 and 14 of the dog clutch 31. The motor is then started to rotate and torque is delivered through the torque transmitting member 11 to the hammer member 12. As the rotational speed of the hammer member 12 increases, centrifugal force operates to throw the balls 30 outwardly from the center of rotation. As the hammer member 12 rotates, a position will be reached in which the apertures 33 register with the impact races 34, at which time the balls 30 are centrifugally forced to move out and contact the bottom of the races 34. As illustrated in the fragmentary view 6, when the balls 30 are in the described outward position in contact with the bottom of the races 34, the flared portions 35 of the apertures 33 are in contact with the balls 30 and tend to cam the balls 30 outwardly from the center of rotation of the hammer member 12, and therefore supplements the action of the centrifugal force. As the rotating hammer member 12 carries the balls 30 along the impact races 34 in the position described, the balls 30 are in position to contact the impact abutment surfaces 36 at the end of the races 34. This position of impact is illustrated in the Figure 6. In the Figure 6, it will be noted that two opposing camming actions tend to operate at the moment of impact between the balls 30 and the abutment surface 36. The camming action by the flared surfaces 35 has been described, and a similar camming action is produced between the abutment surfaces 36 and the balls 30 at the moment of impact. Of course, centrifugal force is also opposing the camming action produced between the surfaces 36 and the balls 30. It is understood however, that the abutment surfaces 36 and the flared portions 35 must be so constructed that the camming action between the abutment surfaces 36 and the balls 30 will be somewhat larger than the combined forces of the camming action of the flared portions 35 in conjunction with the balls 30 and the centrifugal force.

As the nut first starts on the stud, there is very little resistance to its progress. Therefore, the described centrifugal force and the camming action of the flared portion 35 will hold the balls 30 in the races 34 and in contact with the abutment surfaces 36, and thereby cause the anvil member 10 to rotate and deliver full speed rotation to the work engagement part 37. As the nut meets opposition to its free rotation, such as by the nut seating in place or by moving over tight threads, or by any other opposition, the work engagement part 37 and the anvil member 10 tends to slow down and rotate at a slower speed than that of the hammer member 12. However, the balls 30 will stay in their outward position until the camming action between the abutment surfaces 36 and the balls 30 is large enough to oppose the combined force of the camming action of the flared portions 35 and the balls 30 and the described centrifugal forces. As soon as the camming action between the abutment surfaces 36 and the balls 30 is sufficiently large to move the balls 30 back into the apertures 33, the hammer member 12 is free to rotate within the anvil member 10. Thereafter, the balls will be repeatedly thrown out and driven back under considerable opposition as described. Because of this opposition, a momentarily large torque is produced in the anvil 10 which is transmitted to the work engagement part 37. It may not be desirable to produce a torque impact upon every revolution of the hammer member 12, therefore, by selecting balls 30 of a suitable size and weight, and by proper arrangement of the abutment surfaces 36 and the flared portions 35, the number of revolutions which the hammer member 12 will make before the balls 30 are again thrown outwardly into the races 34, may be controlled.

Figure 4:
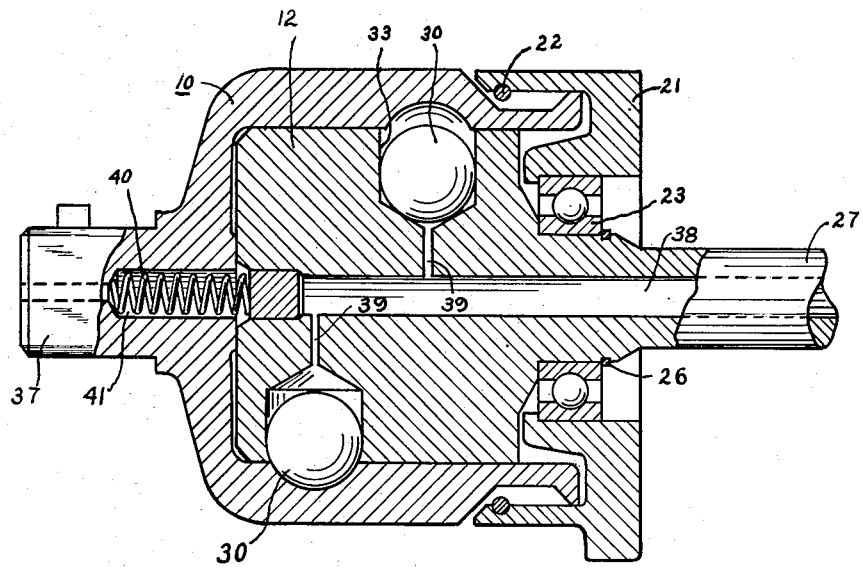
Figure 4 is a longitudinal cross-sectional view of a modified form of an impact clutch employing air pressure cushioning behind the clutch balls.
Figure 5:
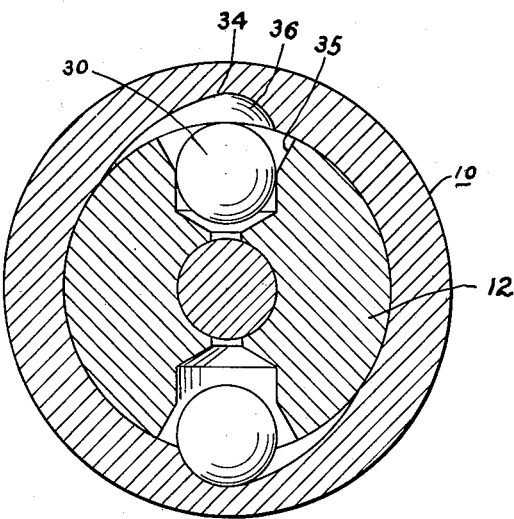
Figure 5 illustrates a modified form of impact surface to contact the balls.

With reference to the Figure 4, I illustrate an alternative type of impact clutch embodying the features of my invention. This embodiment, however, employs only one clutch member, and in addition thereto, provides for live air pressure to supplement the action of the centrifugal force and tends to hold the balls 30 in engagement with the impact races 34 of the anvil. As illustrated, the hammer member 12 is one solid piece and extends to the driving power unit through the power shaft 27. The hammer member 12 is longitudinally slidably mounted relative to, and inside, the anvil member 10. A spring member 40 is positioned within an end cavity 41 of the anvil member 10 and contacts the hammer member 12 to urge the hammer member 12 longitudinally endwise, and thus move the apertures 33 out of alignment with their respective impact races 34. This illustration shows the hammer member 12 as it would appear when pressed inwardly against the action of the spring 40 and in position for operation.

Also, I illustrate a method of delivering air under pressure to the apertures 33 to supplement the centrifugal force action of the balls 30. Whenever air is used, the apertures 33 are preferably made with straight side walls instead of being provided with a flared portion as illustrated by the reference character 35 in Figure 1. The live air pressure from pneumatic motors may be employed for this purpose, if a pneumatic motor is used as a source of power. The air is delivered to the apertures 33 by means of a main artery 38 extending longitudinally within the power shaft 27 and the hammer member 12. Branch ducts 39 extend from the main artery 38 to the apertures 33.

In operation, this embodiment of my invention will permit the hammer member to rotate freely within the anvil member 10 whenever the hammer member 12 is moved longitudinally rearwardly with respect to the anvil member 10. To begin operation, the operator places pressure upon the shaft 27, and thereby moves the hammer member 12 into the position illustrated in the Figure 4. The motor is then started to rotate, and as the rotational speed of the hammer member 12 increases, centrifugal force plus air pressure operates to throw the balls 30 outwardly from the center of rotation. The operations of the balls 30 between the races 34 and the apertures 33 then are exactly as described in connection with the embodiment illustrated in the Figure 1. However, instead of a flared portion 35 to supplement the centrifugal force, the live air pressure that is supplied to the ducts 38 and 39 provide a cushion and active force behind the balls 30. Thus, in order to force the balls 30 back within the apertures 33, the camming action between the surfaces 36 and the balls 30 must be sufficiently large to overcome the combined action of the centrifugal force and the air pressure.

Whenever the impact clutch is to be disengaged from the work piece, the operator removes the pressure exerted on the shaft 27 and thereby permits the spring 40 to urge the hammer member 12 rearwardly and thus move the apertures 33 and the balls 30 out of position to contact the impact races 34. Any further rotation of the driving unit and the hammer member 12, of course, will not cause rotation of the anvil member 10.

Figure 3:
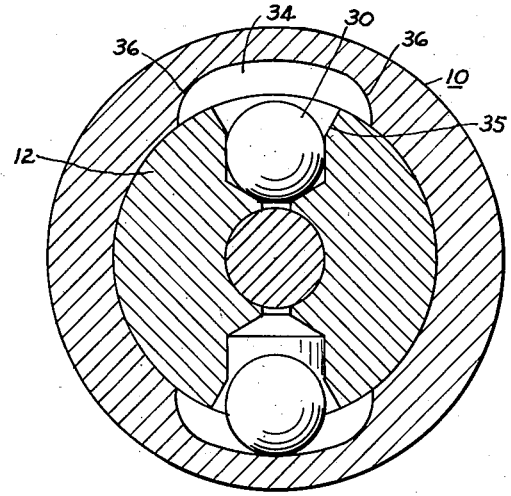
Figure 3 is a cross-sectional view of the Figure 1 taken along the line 3—3 of Figure 1, and showing principally my impact clutch parts.
Figure 2:
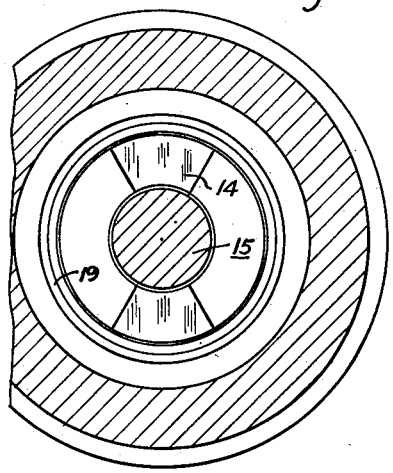
Figure 2 is a cross-sectional view of the dog clutch teeth taken along the line 2—2 of Figure 1; with the separating spring omitted.

It is pointed out, that although most impact clutches should be reversible to turn in either a clockwise or counterclockwise direction, same applications will require only one direction operation. Therefore, the Figures 3 and 5 are included to illustrate two types of impact races 24.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In an intermittent rotary impact clutch, the combination of a revolvable hammer member having walls defining a bore, an anvil member having at least an abutment in alignment with the said bore, an intermediate ball member inserted in said bore for movement under centrifugal forces therein to engage said abutment when the hammer member revolves, means to direct air under pressure into said bore behind said intermediate ball member to supplement said centrifugal forces.

2. In an intermittent rotary impact clutch, the combination of a rotating hammer member having walls defining at least a first and a second bore, said bores being longitudinally spaced in an axial direction from one another, an anvil member having an abutment to correspond to each said bore, said rotating member and said anvil member being shiftable relative to one another in a first position of driving engagement and a second position of free turning to alternately place the bores and their corresponding abutments in cooperating alignment with one another when in the said first position, and to remove the bores and their corresponding abutments from cooperating alignment when in the said second position, and an intermediate member inserted in each said bore for movement under centrifugal forces therein to engage said corresponding abutments when the rotating member and anvil are in the said first position and the hammer member revolves, whereby driving force may be applied to and removed from the anvil member at the will of the operator by shifting the members relative to one another to their first and second relative positions.

WILLIAM M. EMERY.

REFERENCES CITED

The following references are of record in the file of this patent:

UNITED STATES PATENTS

| Number | Name | Date |
|---|---|---|
| 924,749 | Drapiec | June 15, 1909 |
| 1,496,577 | Klausmeyer | June 3, 1924 |
| 1,567,912 | Carey | Dec. 29, 1925 |
| 1,703,061 | Coleman | Feb. 19, 1929 |
| 1,874,658 | Tschudi | Aug. 30, 1932 |
| 2,132,631 | Jones | Oct. 11, 1938 |
| 2,178,657 | Travnicek | Nov. 7, 1939 |
| 2,342,540 | Hale | Feb. 22, 1944 |
| 2,439,337 | Forse | Apr. 6, 1948 |
| 2,439,823 | Porter | Apr. 20, 1948 |

FOREIGN PATENTS

| Number | Country | Date |
|---|---|---|
| 318,623 | Great Britain | Dec. 3, 1930 |
| 431,875 | Great Britain | July 17, 1935 |
| 559,894 | France | June 26, 1923 |
| 580,209 | France | Aug. 25, 1924 |
| 656,826 | France | Jan. 5, 1929 |